United States Patent [19]

Wells et al.

[11] 4,111,537
[45] Sep. 5, 1978

[54] OPTICAL STRUCTURE FOR MICROFICHE READER

[75] Inventors: Thomas R. Wells, Des Plaines, Ill.; Theodore E. Dahlen, West Bend, Wis.

[73] Assignee: Bell & Howell Company, Chicago, Ill.

[21] Appl. No.: 621,905

[22] Filed: Oct. 14, 1975

[51] Int. Cl.² .................................................. G03B 3/00
[52] U.S. Cl. ........................................ 353/101; 353/87; 353/78
[58] Field of Search .................. 353/101, 100, 27, 76; 350/254, 255

[56] References Cited

U.S. PATENT DOCUMENTS

| | | | |
|---|---|---|---|
| 3,413,061 | 11/1968 | Simpson et al. | 353/27 R |
| 3,601,482 | 8/1971 | Harvey | 353/101 |
| 3,634,005 | 1/1972 | Peters et al. | 353/101 |
| 3,791,727 | 2/1974 | Kleekanp | 353/101 |
| 3,809,460 | 5/1974 | Lettan et al. | 350/254 |
| 3,834,800 | 9/1974 | Brownscombe | 353/27 R |
| 3,888,576 | 6/1975 | Bolgar et al. | 353/76 |

*Primary Examiner*—Harry N. Haroian
*Attorney, Agent, or Firm*—Harry G. Thibault; Alan B. Samlan

[57] ABSTRACT

A microfiche reader providing varying optical paths of projection of a microfiche image. The light source for the reader may be removed and readily replaced without the operator's touching the sensitive lamp. Dual image forming, floating lenses having a universal focusing system provide multiple magnification capabilities with uniform focusing in all positions of the microfiche. The focusing system is self-compensating for mechanical tolerances. Additional means prevent chipping of the glass plates holding the microfiche when the floating lenses are removed from contact with the glass plates.

10 Claims, 8 Drawing Figures

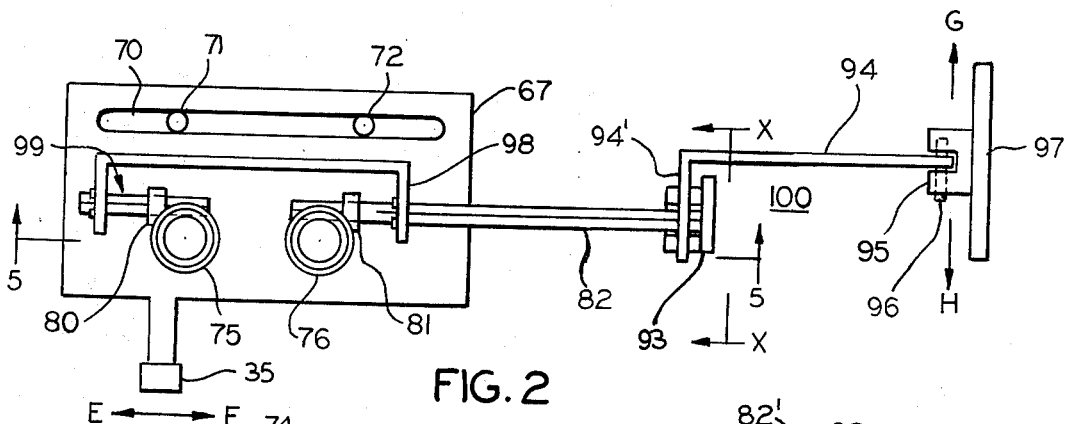
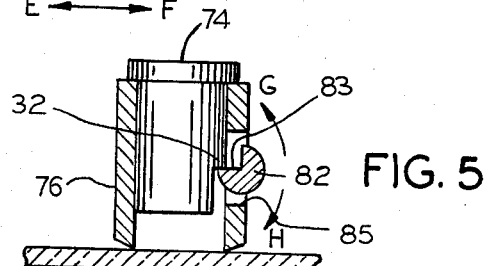
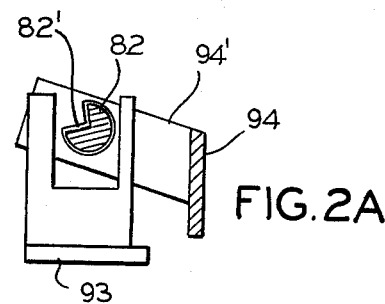
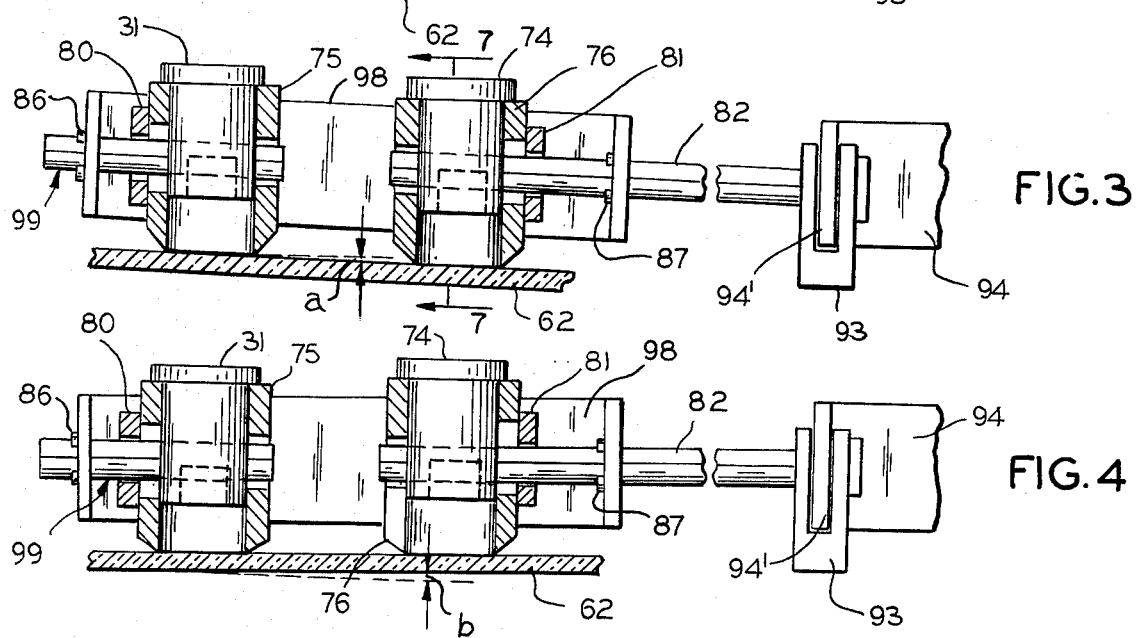
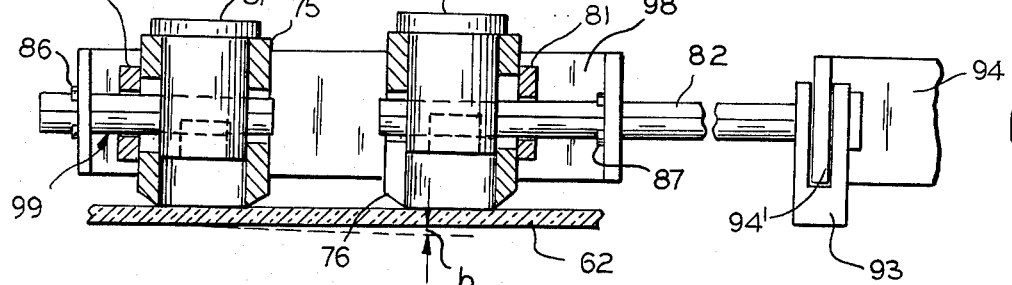
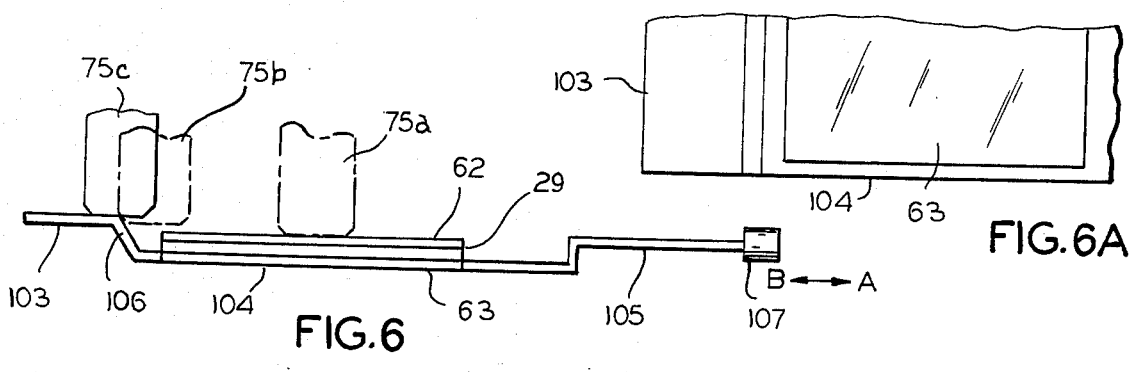

OPTICAL STRUCTURE FOR MICROFICHE READER

BACKGROUND OF THE INVENTION

This invention relates to microfiche readers and more particularly to the focusing system used in such readers for projecting images photocopied on microfiche.

Microfiche film is a known form of graphic data presentation wherein a number of pages or images are photographically reproduced on a single "card" of microfiche film (such as a card of 3 inches × 5 inches to 4 inches × 6 inches, for example). Any suitable number of pages (up to, say, a thousand or so) may be photographically formed in an orthogonal array on a single microfiche card of photographic film. The microfiche film may then be placed in an optical reader and moved over a rectilinear path until an image or a selected page is in an optical projection path leading to a display screen.

It is uneconomical to provide a microfiche reader system for a single microfiche card; therefore, the user is likely to have an entire library file made up of many microfiche cards which must be kept in a specific order for quick recall. Therefore, microfiche readers are adapted to file and store a quantity of microfiche in a library file, remove and mechanically manipulate the microfiche, and then refile it in the library file. The mechanical manipulation of a microfiche involves sliding the microfiche into and out of the library file, moving it in a path in X and Y directions, and projecting a selected image in the orthogonal array through the optical path of a projector. Hence, mechanical microfiche reader equipment may be designed to find and select the desired one of the many microfiche images in the library file and to project it without damage. Then, the microfiche must be safely returned to the library file for storage.

The preferred reader is a compact unit which may be carried about if need be. The optical path must be long enough to increase the very small photocopy image to an easily readable compact unit.

SUMMARY OF THE INVENTION

Accordingly, it is an object of the present invention to provide a simple microfiche reader device, obvious in its operation and which may be used by people who have no special training in the use of a microfiche reader.

An additional object is to enable a casual patron of a public library to use the reader with only the simplest instructions.

Still another object of this invention is to provide a microfiche reader where even simple maintenance may be performed by persons having little or no training.

In particular, it is the object of this invention to provide a microfiche reader which is easily focused, which switches projection scales, and which maintains accurate focus despite minor misalignments of mechanical parts.

It is also the purpose of this invention to allow easy removal of the microfiche film and to avoid injury to the glass plates holding the microfiche and the floating lenses.

These and other objects of the invention are accomplished by providing a microfiche reader that employs dual lens systems. The lenses are focused by a unique linkage system that compensates for any mechanical variations in the system and thereby maintains both lenses in focus. Because it is simple, the linkage system is reliable and operates consistently.

A unique carrier is provided that allows the easy withdrawal of the microfiche film from beneath the lenses. The carrier raises and lowers the lenses automatically while it is being withdrawn for access to the microfiche.

BRIEF DESCRIPTION OF THE DRAWINGS

The preferred form of the invention is shown in the attached drawings.

FIG. 2 is a plan view of a pair of image lens and of a focusing mechanism;

FIG. 2A is a side elevation along line $x—x$ of a focusing arm connection.

FIG. 3 shows schematically a partial front elevation view taken substantially along line 5—5 of FIG. 2, particularly illustrating how accurate focusing is maintained when mechanical parts are misaligned in one direction;

FIG. 4 is a partial front elevation view similar to FIG. 3 but showing the maintenance of accurate focusing when misalignment is in an opposite direction;

FIG. 5 is a schematic partial side view taken along line 7—7 of FIG. 3 illustrating of the focusing mechanism for selectively raising or lowering the image lens;

FIG. 6 is a diagram showing how the image forming lenses slide over a glass carrier without chipping the edge of the glass; and FIG. 6A is a plan view of the glass carrier shown in FIG. 6.

With reference to FIG. 1, the major assemblies of the invention microfiche reader 20 are a hood 21, screen 22, housing 23 and lamp tray 25. The hood 21 is a hollow box which includes a number of mirrors 26, 27 defining a folded optical path having a center axis 28 over which an image is projected from microfiche 29 and onto screen 22. The screen may be ground glass or an equivalent plastic material.

Figure 1:
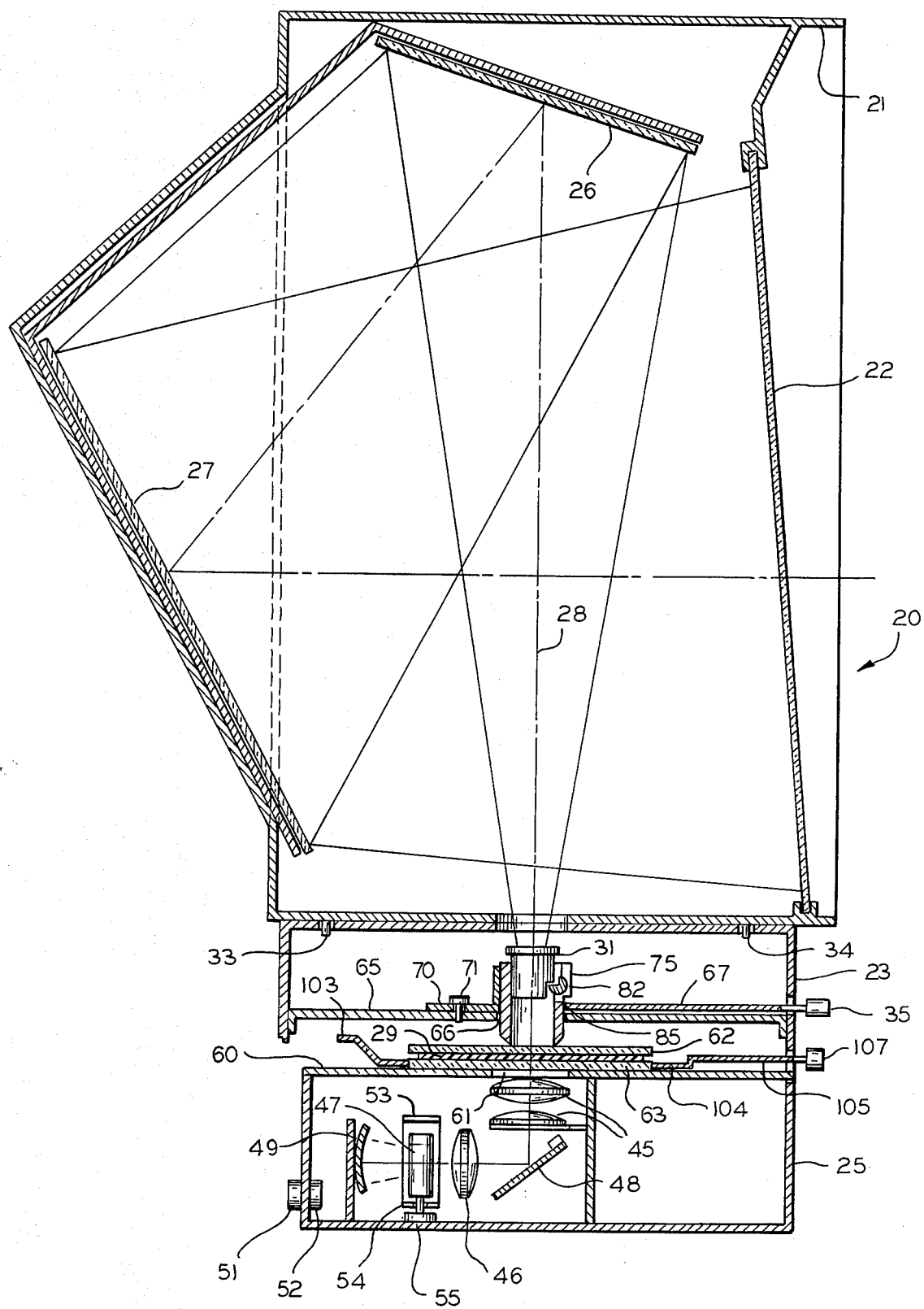
FIG. 1 is a cross-sectional schematic of the invention showing the optical path of the inventive microfiche reader.

When an image lens on a microfiche film is placed under image forming lens 31, that image is projected over the folded path in the hood and onto the screen 22, where the units are set up as shown in FIG. 1. In greater detail, it should be noted that the hood 21 includes a pair of pins 33, 34 on the underside thereof which fit into mating holes on top of the base unit or housing 23. Hence, the hood may be placed over the base unit 23 with the viewing screen 22 facing the reader controls 35. This way the operator may look at the picture projected onto screen 22 while manipulating the controls. Alternatively the hood 21 may be picked up and rotated 180° so that pins 33, 34 reverse their positions (as viewed in FIG. 1). This way the self-contained reader screen 22 may be removed, and the image may be projected onto a wall or separate screen (not shown).

The chassis of the microfiche reader comprises a base unit (not shown) having the housing 23 superimposed thereon. The base unit includes tray 25 having a group of condenser lenses 45, 46 for projecting the light of a lamp 47 via mirror 48. A reflector 49 is located behind the lamp 46 to reflect the light back into the image and optical path 28. Mirror 48 is preferably a dichroic mirror which has the inherent capability of reflecting only the light rays of the electromagnetic spectrum, while refracting the heat rays. Thus condenser lenses 45 remain relatively cool, and the heat from lamp 47 is dissipated primarily in the housing of tray 25.

Tray 25 glides on tracks (not shown) formed in the base unit. A connector 51 in the base unit mates with a corresponding connector 52 in the tray 25. Thus, to change lamp 47 it is only necessary to remove tray 25 and to replace it with another similar tray. This is important because certain modern lamps tend to break if handled owing to the salt on human fingers. Accordingly one person may be trained to replace lamps, but the unskilled operator does not have to touch the lamp. The trained person uses an extractor tool 53 having forked ends 54 for lifting the lamp 47 from a socket 55.

The tray 25 is covered by a plate 60 which slides into tracks (not shown) superimposed about the tray. A hole 61 in the plate 60 enables passage of a light beam from the condenser lens 45 to the image forming lens 31. On the plate 60 may be a grid which outlines the various positions of the microfiche films. The plate 60 may be removed and inverted or replaced to identify any of various sizes of microfiche image patterns.

Glass carrier plate 104 (FIGS. 1 & 6) is slidably mounted on horizontal plate 60 between condenser lenses 45 and image lens 31. Carrier plate 104 holds glass plate 63, as more fully described later. Situated on glass plate 63 is an upper glass plate 62. Upper glass plate 62 may be lifted and a microfiche 29 located between glass plates 62, 63. It should be apparent how the microfiche image is placed under glass plate 62 and under image lens 31.

An image lens support plate 65 is mounted in a suitable manner inside housing 23 over hole 61 and condenser lens 45. A cutout or slot 66 in support plate 65 receives lens mounts 75,76 through which light passes from condenser lens 45 to image lens 31. Over support plate 65 is a sliding lens selecting plate 67 having a slot 70 formed therein (see FIG. 2). A pair of retainers 71,72 (FIG. 2) fit through slot 70 and are secured to the plate 65. Connected to plate 67 is a handle and knob 35 that allows the operator to move plate 67. Thus, by moving knob 35 in either the E or F direction, as shown in FIG. 2, the operator can selectively locate one of the image lenses 31, 74 loosely disposed within lens mounts 75, 76, respectively. The retainers 71,72 act as guides for the path of plate 67. Each lens provides a different magnification, such that one lens may project one size microfiche image and the other a different size microfiche image.

The lens mounts 75,76 (FIG. 3) are floatingly mounted in any conventional manner within the plate 67, and are adapted to telescopically hold lenses 31,74. Mounted on each lens mount 75,76 are aligning bearings 80,81 (FIG. 3) for receiving focusing rods 82,99 respectively. Rods 82,99 comprise first and second linkages for focusing the lenses 31, 74 and consist of; three-quarter circular sections, as shown in FIG. 3, which is a cross-section taken along line 5...5 in FIG. 2. The bearing surface 83 of rod 82 loosely passes through aligning bearing 81 and fits into an opening in lens mount 76. Focusing lens 74 is shaped with a portion 32 that rests on bearing surface 83 of rod 82. A thumb wheel 97 is connected by shaft 94 to rod 82, as will be more fully described. By turning thumb wheel 97 in either direction G or H, as shown in FIGS. 2 and 5, the operator causes rod 82 to rotate in the corresponding direction. This causes the focusing lens 74 to translate up or down within lens mount 76 through bearing surface 83 acting on shaped portion 32. In turn, this changes the focus of lens 74. In an identical manner rod 99 which passes through aligning bearing 81 into lens mount 75 acts upon lens 31 causing it to change focus in relation to the direction in which the thumb wheel 97 is turned. Movement of thumb wheel 97 is transferred to rod 99 from rod 82 by means of a third linkage or U-bar 98 extending between rods or linkages 82,99 (FIGS. 2, 3 and 4).

The employment of dual, alternate lens systems provides many desirable benefits. It also creates the problem of maintaining focus through a single focusing means. Since all parts, especially mechanical parts, have certain manufacturing tolerances, it is necessary to have a focusing system that takes this into account and compensates for the variations that may occur. At the same time, the optical path of lenses 31 and 74 must remain perpendicular to the microfiche film being viewed, if image quality is to be preserved. Through the construction of the focusing mechanism 100, image lenses 31, 74 are assured of being perpendicular to the microfiche film and any tolerances causing a distortion in the position of one lens will be isolated from the second. Concurrently, the lenses 31, 74 will retain their ordinal relation to the upper glass plate 62.

The bottom of lens mounts 75, 76 are rounded or beveled to enable them to glide freely over the surface of glass 62. The operation and significant advantage of the floating mounts 75, 76 and the focusing mechanism 100 is specifically illustrated by FIGS. 3 and 4, which are drawn to exaggerate errors that accumulate in such equipment. The accumulation of tolerances is illustrated by glass plate 62 dipping to the right at an angle 'a' in FIG. 3 and alternately, glass plate 62 dipping to the left at an angle 'b' in FIG. 4. Yet in both instances, lens mounts 75,76 sit squarely in contact with glass plate 62 and therefore perpendicular to the microfiche 23 just beneath plate 62.

The lens mounts are maintained in a perpendicular optical path through the construction of linkage 100. There, thumb wheel 97 is connected to rod 94 by way of bracket 95 that allows 94 to pivot about pin 96. Rod 94 is right-angled at 94' and connected to three-quarter-sectioned rod 82. Support 93, as best shown in FIG. 2A, allows rod 82 relatively free vertical movement, while maintaining relatively stationary horizontal translation. The interfacing 82' between rod 82 and the right-angled portion 94' of rod 94 is tolerated so as to allow for some pivotal movement between these parts, although this is not essential. The opposite end of rod 82 then passes loosely through bearing support 81 and interacts with focusing lens 74. Connected to rod 82 nearer the bearing support 81 by means of spring retainer 87, is one leg of an elongated U-bar 98 that transmits the rotation of thumb wheel 97 to rod 99. Spring retainer 86 is connected to rod 99 to cooperatively work with retainer 87 to prevent lateral movement. The legs of U-bar 98 are loosely connected to rods 82 and 99 by the spring retainers 87,86 to provide some degree of play or independent movement between the bar and each rod (not shown). In this arrangement, rods 82,99 are allowed to move relative to U-bar 98 and rod 94. This can best be seen by examining the relative independent movement of rods 82,99 in FIGS. 3 & 4. Thus, lens mounts 75,76 are allowed the freedom, unencumbered by a restraining focusing mechanism with firm linkage connections, to maintain a perpendicular optical path with the microfiche 29 and glass plate 61, while employing one focusing mechanism for both lenses.

One can see that the configuration of U-bar 98 and focusing rods 82 and 99 helps to diminish distortion between lenses. By extending the physical distance between components, one diminishes the amount of distortion transmitted to the next component. This effect could be altered through appropriate trade-offs of play, i.e., tolerance, between the connection points for each related member and the overall length of each component and still not depart from the invention.

During the operation of the reader it will be necessary to allow for the replacement of the microfiche films located between glass plates 62,63. To do this, one must withdraw plates 62,63 that are located beneath lens mounts 75,76 and separate the plates. To accomplish this purpose, the carrier 104 (FIGS. 1 & 6) supporting glass plates 62,63 can be moved to the right, by pulling on handle 107 until the plates are out from under the lenses. However, since lens mounts 75,76 float freely on the surface of the glass they could ride off and chip the edges of the glass. The same chipping may occur when glass plates 62,63 are returned to their position beneath lenses 31,74.

To alleviate this problem, an upwardly extending shelf 103 is formed on the back of carrier 104. This shelf 103 receives and supports the lens mounts 75,76 when the carrier 104 is moved in direction "A" (i.e., out from under the lens mounts). More specifically, at the position 75a, the lens mount rests upon and slides over the surface of glass plate 62. As the carrier 104 is pulled in direction "A" the lens mount is in position 75b and engages the shelf at a tapered portion 106. At 106, the edge between the shelf 103 and the lens mount are in the shape of mutually inclined planes. Thus, the lens mount is lifted to the position shown as 75b since the plane of shelf 103 is slightly higher than the plane of glass plate 62. Finally, the carrier 104 reaches the outward extremity of its movement in direction "A" and the lens mount is resting in position 75c upon the shelf 103.

The glass plate 62 is now lifted in any suitable manner. The microfiche is removed, cleaned replaced or otherwise adjusted. Then, glass plate 62 is lowered and carrier 104 is pushed back in direction "B". The lens mount 75 returns over the path indicated by the three positions 75c,75b and 75a to the reading position. It should be noted that because of the geometry and position of shelf 103, lens mounts 75,76 and the location of plate 62 that as the lens mounts 75,76 cross the edge of the glass plate 62, it is lifted over the edge of the glass surface. Thus, the edge of glass plate 62 is never touched by the sliding lens mounts. In addition, since the difference in heights between the plane of shelf 103 and glass plate 62 is minute, the lens mount is gently returned to the surface of glass plate 62 when the carrier 104 is moved in direction "B".

FIG. 6A illustrates the top view showing the construction of carrier 104 and glass plate 63. It should be noted that glass plate 63 is situated within carrier 104 and forms a part thereof.

Those who are skilled in the art will readily perceive how various modifications can be made. Therefore, the appended claims are to be construed to cover all equivalent structures.

I claim:

1. A microfiche image reader having a housing; optical projection means in said housing including a source of light and magnification means for projecting said light in a path from said housing; said magnification means comprising side-by-side image forming lenses and lens mounts for slidably receiving each of said lenses; moveable plate means mounting said lens mounts for alternative selective movements into and out of said light path; and a single focusing control means means for concurrently focusing said lenses, said single focusing control comprising separate lens adjusting means individually engaged with each of said image-forming lenses, bearing means mounted on each of said lens mounts for loosely receiving said separate lens adjusting means for allowing vertical play adjusting means, linkage means interconnecting said separate lens for concurrent movement, said play between the separate lens adjusting means and said bearing means enabling said lens mounts and lens carried thereby to align themselves within the play allowed by said bearing means in order to isolate the effect of any physical misalignment between the relative positions of said lenses while maintaining said lenses perpendicular to said light path.

2. The microfiche image reader of claim 1 including:
a removable carrier means located between said source of light and said lenses for holding a microfiche image in said path of light;
and a displacing means cooperatively connected to said carrier means for displacing said lenses relative to said carrier means whenever said carrier means is removed.

3. The microfiche image reader of claim 2 wherein said focusing control means further comprises a mechanical linkage including:
a moveable adjusting means; and
a transmitting means pivotally connected to said moveable and to said lens adjusting means.

4. The microfiche image reader of claim 3 wherein:
bearing surface means are formed on each of said lenses for cooperative engagement with each of said separate lens adjusting means and
means situated on each of said separate lens adjusting means in alignment with said bearing surface means, whereby movement of said lens adjusting means causes a corresponding movement of said lenses.

5. The microfiche reader of claim 4 wherein said moveable adjusting means is accessible from the outside of said housing.

6. A microfiche image reader comprising a housing; an optical projection means in said housing, including a source of light and a plurality of lens mounts, each mount including an image forming lens slidably received therein for projecting said light in a path from said housing;
means for mounting and alternatively positioning a selected one of said lens mounts in said light path;
carrier means for holding a microfiche image in said path of light so that a microfiche can be inserted into or removed from said housing;
and single focusing means comprising lens separate shaft means operatively connected to corresponding ones of said lens to concurrently focus said lenses, bearing means on each of said lens mounts for loosely supporting said shaft means so that they may have some play therebetween, said single focusing means including linkage means for loosely interconnecting said two separate shaft means whereby said plurality of lenses are isolated from each other so that the effect of any physical misalignment between the relative positions of said lenses is eliminated while maintaining said lenses perpendicular to said light path.

7. The microfiche reader of claim 6, wherein said carrier means consists of a slidable plate on which is located said microfiche image and on top of which is located a second plate, and connected to said first plate is a control means extending outwardly from said housing.

8. The microfiche reader of claim 7, wherein said carrier means includes a displacing means that displaces said lenses relative to said slidable plate when said displacing means is caused to engage said lenses.

9. The microfiche reader of claim 8, wherein said displacing means is an angled platform that lifts said lenses when placed in engaging contact with said lenses.

10. A microfiche image reader having a housing; optical projection means in said housing, including a source of light and magnification means for projecting said light in a path from said housing; said magnification means including a plurality of alternatively used image-forming lenses of different magnification ratio, telescopically mounted in lens mounts; means for mounting and selectively moving any desired one of said lens mounts into said light path; a carrier plate having first and second glass plates adapted to receive a microfiche film between them, said lens mounts resting freely upon the upper surface of said second glass plate; control handle means connected to said carrier plate and extending outwardly from said housing to provide means for moving said carrier plate; lens displacing means also connected to said carrier plate and opposite the location of said control handle means to remove said lens from said upper surface when said carrier plate is moved, to enable a removal of the microfiche film from said housing; manually operable focus control means disposed in said housing and comprising a first and second linkage means separately and operatively connected to individual ones of said lenses; bearing means on said mounts for supporting and loosely receiving with play said first and second linkage means a third linkage loosely but operatively coupled between said first and second linkage means, a transmitting rod means connected with a common adjusting means and with one of said first and second linkage means to transmit the movement of the common adjusting means through said loose coupling to the other of said linkage means, whereby movement of said common adjusting means causes said first and second linkage means to act upon said lenses to selectively vary the telescoping positions of said lenses in said mounts and therefore the focus of said lenses relative to said microfiche film, whereby the looseness of said third linkage concurrently isolates each of the lenses from any focusing error induced by mechanical variations that may be present in the respective components of the magnification means, focus control means and carrier means.

* * * * *